March 11, 1924.

T. H. TALLEY

HEADLIGHT

Filed Dec. 26, 1922

Inventor.
Thurmon H. Talley

March 11, 1924.
T. H. TALLEY
HEADLIGHT
Filed Dec. 26, 1922
1,486,616
2 Sheets-Sheet 2
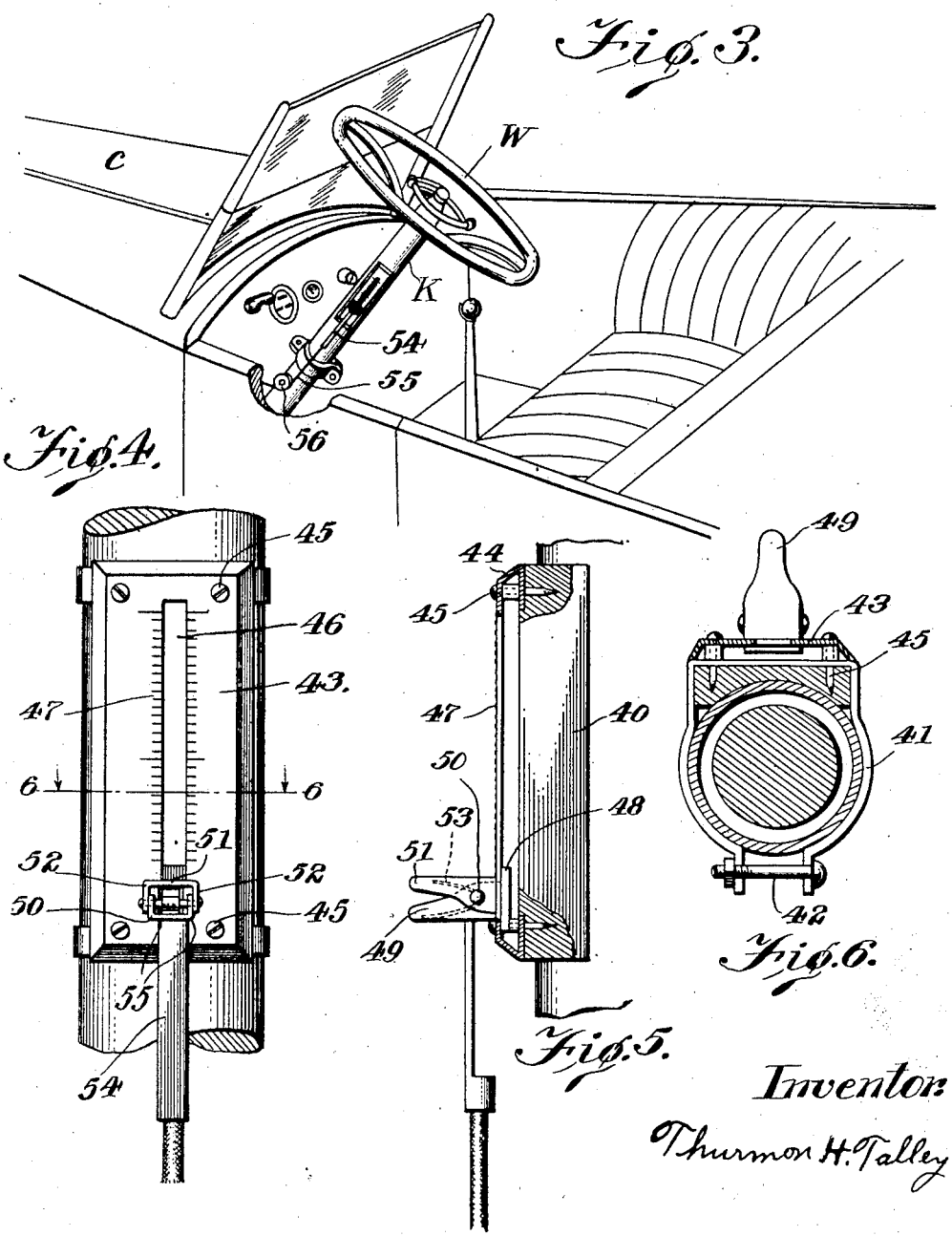
Inventor
Thurmon H. Talley Patented Mar. 11, 1924.

1,486,616

UNITED STATES PATENT OFFICE.

THURMON H. TALLEY, OF PLAINVIEW, TEXAS.

HEADLIGHT.

Application filed December 26, 1922. Serial No. 609,107.

*To all whom it may concern:*

Be it known that I, THURMON H. TALLEY, a citizen of the United States, and a resident of Plainview, in the county of Hale and State of Texas, have invented certain new and useful Improvements in Headlights, of which the following is a specification.

This invention relates to improvements in headlights.

The present invention more particularly relates to improvements in headlights for motor vehicles or the like, and has for its principal object to provide a headlight which may be adjustably tilted and thereby permit the shaft of light emanating therefrom to be directed forward the distance desired.

It is also an important object of the invention that means be provided whereby the headlights may be operated by the driver of the associated motor vehicle.

It is a further object of the invention that means be provided to movably hold the headlights so that the shaft of light therefrom is directed immediately forward to the motor vehicle and thereby avoid the possibility of blinding the operators of oncoming vehicles or other persons similarly situated.

Other objects, and objects relating to details of construction, combination and arrangement of parts will hereinafter appear in the detailed description to follow.

The invention is illustrated by way of example in the accompanying drawings, in which:

Figure 3 is a fragmentary perspective view showing the manner in which the headlights may be operated by the driver of a motor vehicle.

Figure 4 is a detail plan view illustrating the control for the tiltable headlights which may be positioned upon the steering column.

Figure 5 is a view in side elevation of the same.

Figure 6 is a sectional view taken on lines 6—6 of Figure 4.

Figures 1, 2:
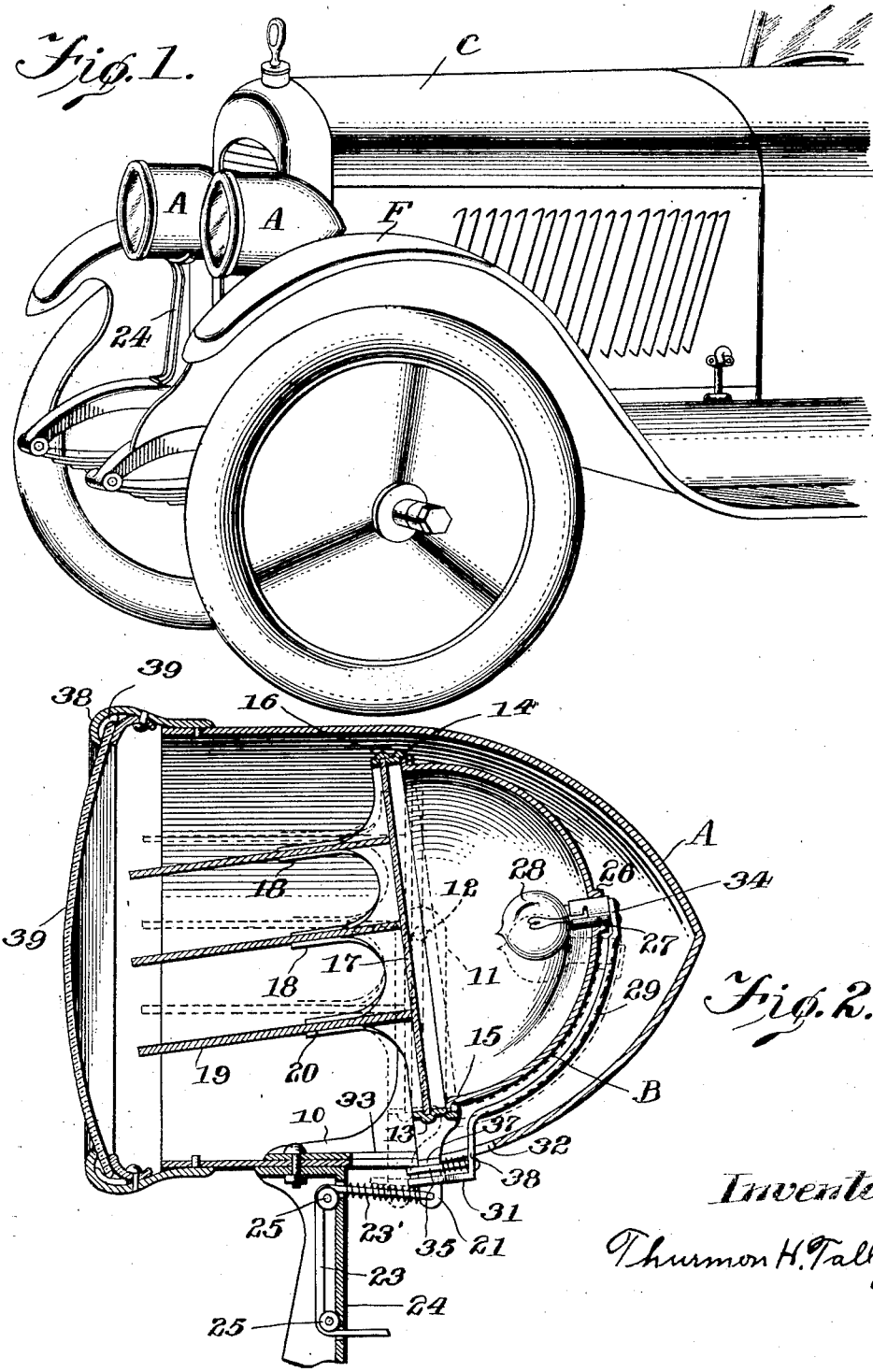
Figure 1 is a perspective view of the front portion of a motor vehicle and showing the present invention applied.
Figure 2 is a vertical longitudinal sectional view taken through a headlight embodying the present invention, the normal position of reflector being shown in full lines and a tilted position thereof shown in dotted lines.

Referring to the drawings more particularly, the headlight may consist in an outer casing A and an inner casing or reflector B, said reflector or casing B being of considerably smaller dimensions than the casing A and positioned at the rear end thereof as shown to advantage in Figure 2. Within the casing A there is provided a U-shaped member 10 which is positioned as shown, and the leg portions 11 pivotally supporting therebetween the reflector B, said leg portions being pivotally connected at their free ends to the casing B as indicated at 12. The forward end of the reflector B carries a ring 13, said ring having an annular groove upon its inner periphery as at 14 which is adapted to receive a flange or lip 15 formed about the reflector B and thus to support or secure the ring 13 upon the reflector B. The ring 13 is also provided with a second groove 16 upon its inner periphery which is adapted to receive a lens 17. Upon the forward edge of the ring 13 there is provided a plurality of fingers 18, said fingers being arranged in sets and three fingers preferably constituting each set. The fingers of one set are diametrically opposed to the fingers of the other set, and between each pair of aligned fingers there is supported a reflector plate 19. These plates may be made of any desirable material and each should have a lower light reflecting surface, while the upper surface of each plate should be non-reflecting to rays of light. The fingers 18 are preferably clamped about the associated edges of the plates 19 as shown at 20 whereby to hold the same against removal.

Upon the ring 13 there is further formed a downwardly extending arm 21 which has connected thereto the one end of a cable 23, said cable extending longitudinally of a bracket arm 24 and from thence to steering column of the associated motor vehicle. A coiled spring 23' encircles the cable and is disposed between the arm 21 and bracket 24, as shown. The cable 23 should be passed over pulleys 25 in order to facilitate the movement of the same whereby to tilt the reflector B upon its pivotal support.

The rear end of the reflector B is provided with a central opening and about which there extends an annular flange 26. The opening in the reflector B is adapted to receive the lamp socket 27, and said lamp socket supports an electric lamp 28. An arcuate shaped member 29 is provided having its lower end formed with an offset portion 30 which terminates in a forwardly extending portion 31, said forwardly extending portion in turn being bifurcated at its free end and straddles the arm 21. The casing A and also bridge portion of U-shaped member 10 each have an elongated slot as at 32 and 33 respectively to permit forward and rearward movement of the lower end of member 29 and the arm 21. The upper end of the member 29 is provided with an offset portion 34 to which the lamp socket 27 is secured. A bolt 36 extends forwardly from the portion 30 of member 29 and is threaded through a lug 37 formed upon the arm 21. A spring 38 encircles the bolt 35 and holds arm 29 against forward movement.

The forward end of the outer casing or housing A is preferably closed with a lens generally indicated by the reference numeral 39. This lens may be held upon the casing by a suitable bezel 38, and between the lens of the associated end of the casing there may be interposed a gasket in order to hold lens 39 against vibration.

Referring to Figures 1 and 3, C indicates generally the body of an automobile and F the front fenders thereof. As is seen a trick arm 24 supports each lamp. Referring to Figure 3, K indicates generally a steering column and W the steering wheel associated therewith. Upon the steering wheel there is secured an elongated block 40, said block having its lower face complemental to the outer periphery of the steering column K as illustrated to advantage in Figure 6 and secured in position upon the steering column by the means of a pair of straps 41. As shown the strap is positioned adjacent each end of the block 40 and has its divided ends secured together by the means of a bolt 42. Upon the block 40 there is mounted an elongated plate member 43 which is formed with an inturned marginal flange 44 adapted to rest upon the block 40. A plurality of nails or screws 45 are employed for securing the plate member 43 to the block 40. These screws serve to hold the plate member 43 in spaced relation with the top surface of the block 40.

The plate member 43 is provided with a longitudinally extending slot 46, said slot being closed at each end as shown in Figures 4 and 5. The plate is also provided with a plurality of depressions or notches along each edge of the slot 46 as at 47. These depressions or notches are so arranged to indicate graduations and a specific purpose thereof will later become apparent. A plate or shoe 48 is arranged beneath the plate 43 and in register with the slot 46. The plate 48 has extending upwardly therefrom a handle 49 which is adapted to move through the slot 46. The handle 49 has extending transversely thereof a pivot bolt 50 which pivotally supports a latch member 51, said latch member being formed with an arm 52 upon each side thereof whereby the same may be pivotally connected to the bolt 50. This latch member is adapted to engage upon the upper surface of the plate 43 and in the notches 47. A spring 53 is employed to press the latch member for engaging with the depressions or notches 47 of the plate 43 and thereby to adjustably hold the handle 49. A connecting member 54 is provided having its one end terminating in a pair of prongs 55 which are pivotally connected to the bolt 50. The other end of the member 54 is secured to the one end of a cable 55, said cable passing over a pulley 56 carried by the steering column K and its other end connected to each of the cables 23. As is obvious with this arrangement the reflectors or casings B can each be manipulated through the cable 55.

In the use of the present invention, the control means therefor, namely: the handle 49 and associated shoe 48 are normally positioned as illustrated in Figures 3, 4 and 5. When in this position the reflectors B assume the shoe-line position illustrated in Figure 2. The spring 23' yieldably maintains the associated reflectors B in this position. With the reflector of each lamp in this position, the shaft of light emanating therefrom is directed immediately forward to the motor vehicle and in this manner a possibility of blinding the drivers of oncoming vehicles is eliminated. In case that the driver with which the present invention is associated is about to ascend a hill and wishes the road forward to his motor vehicle properly illuminated, then he should manipulate the latch member 51 to release the handle 49 and then move the handle together with its shoe 48 to an intermediate position of the plate 43. This operation will bring the reflector of each lamp to its dotted line position shown in Figure 2. If this is not sufficient tilting of the reflectors, the same can be further tilted to direct the rays of light therefrom further forward to the motor vehicle by further upward movement of the handle 49 and associated shoe 48. As is obvious any desired illumination of the road forward to the motor vehicle may be obtained by proper tilting of the reflectors B. In case it is desired to change the intensity of the different headlights, the socket 27 may be adjusted for this purpose. This socket 27 may be adjusted through the screw bolt 35, that is, the same may be advanced or retracted within the associated reflector B.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:—

1. A headlight, comprising a casing, a reflector pivotally supported within a rear end of said casing, a lamp supported within said reflector, a ring carried by the forward end of said reflector, said ring carrying a transparent lens, a plurality of integral fingers extending forwardly from the ring, and a plurality of horizontally disposed reflector plates supported by said fingers.

2. A headlight, comprising a casing, a reflector tiltably supported within a rear end of said casing, a lamp supported within said reflector, and a plurality of horizontally disposed reflector plates forward of said reflector.

3. A headlight, comprising a casing, a reflector tiltably supported within a rear end of said casing, a lamp supported within said reflector, a plurality of horizontally disposed reflector plates forward of said reflector, and a plurality of horizontally disposed reflector plates carried by said reflector and disposed forwardly thereto.

4. A headlight, comprising a casing, a reflector tiltably supported within a rear end of said casing, a lamp supported within said reflector, a ring supported by the forward end of said reflector, and a plurality of horizontally disposed reflector plates supported within said ring.

5. A headlight, comprising a casing, a reflector tiltably supported within a rear end of said casing, a lamp supported within said reflector, a ring carried upon the forward end of said reflector, and a plurality of superposed and horizontally disposed reflector plates carried by said ring.

6. A headlight, comprising a casing, a reflector tiltably supported within a rear end of said casing, a lamp supported within said reflector, a ring carried by the forward end of said reflector, a plurality of integral fingers extending forwardly from the ring, and a plurality of horizontally disposed reflector plates supported by said fingers.

THURMON H. TALLEY.